US008426824B2

(12) United States Patent
Jongen et al.

(10) Patent No.: US 8,426,824 B2
(45) Date of Patent: Apr. 23, 2013

(54) DEVICE AND METHOD FOR MEASURING CHARACTERISTICS OF AN ION BEAM

(75) Inventors: Yves Jongen, Louvain-la-Neuve (BE); Martin Arnold, Constance (DE); Yves Claereboudt, Nil-St-Vincent (BE); Damien Prieels, Court-St-Etienne (BE)

(73) Assignee: Ion Beam Applications S.A., Louvain-la-Neuve (BE)

( * ) Notice: Subject to any disclaimer, the term of this patent is extended or adjusted under 35 U.S.C. 154(b) by 0 days.

(21) Appl. No.: 12/935,254

(22) PCT Filed: Mar. 30, 2009

(86) PCT No.: PCT/EP2009/053761
§ 371 (c)(1),
(2), (4) Date: Dec. 10, 2010

(87) PCT Pub. No.: WO2009/121850
PCT Pub. Date: Oct. 8, 2009

(65) Prior Publication Data
US 2011/0089329 A1    Apr. 21, 2011

(30) Foreign Application Priority Data
Mar. 29, 2008    (EP) .................................... 08153676

(51) Int. Cl.
*G01T 1/24*    (2006.01)
(52) U.S. Cl.
USPC ................................................... 250/370.01
(58) Field of Classification Search . 250/370.01–370.15
See application file for complete search history.

(56) References Cited

U.S. PATENT DOCUMENTS
2010/0012859 A1* 1/2010 Claereboudt .............. 250/492.3

FOREIGN PATENT DOCUMENTS
| DE | 3516696 A1 | 11/1985 |
| DE | 3901906 A1 | 7/1990 |
| DE | 19606809 C1 | 3/1997 |
| WO | 00/40064 A2 | 7/2000 |
| WO | 03/065023 A1 | 8/2003 |
| WO | 2005/006017 A1 | 1/2005 |
| WO | 2008/112960 A1 | 9/2008 |

OTHER PUBLICATIONS

Reist et al., "Concept for handling and service of the PROSCAN degrader unit," 2003, PSI-Scientific and Technical Report, vol. VI, pp. 109-112.*
Gall et al., "Alanine EPR Dosimeter Response in Proton Therapy Beams," 1996, Applied Radiation and Isotopes, vol. 47, No. 11/12, pp. 1197-1199.*
Yun et al., "A beam optics study of the biomedical beam line at a proton therapy facility," 2007, Nuclear Instruments and Methods in Physics Research B, vol. 263, pp. 513-517.*
C. Brusasco et al., "Verification of 3D dose distributions in heavy-ion radiotherapy." J. Jpn. Soc. Ther. Radiol. Oncol., 9 (Suppl. 2):59, 1997, 8 pages.

(Continued)

*Primary Examiner* — Kiho Kim
(74) *Attorney, Agent, or Firm* — Fitch, Even, Tabin & Flannery LLP

(57) ABSTRACT

The present invention relates to a detector for measuring characteristics of an energetic particle beam generated by a radiation source, the detector including means to vary the incoming particle beam energy; a plurality of sensors arranged in parallel; and processing means capable of processing signals coming from said sensors in correlation with said energy variation.

17 Claims, 10 Drawing Sheets

OTHER PUBLICATIONS

H. Berkhoff et al., "Test of a Multi-Layer Faraday Cup for Quick Beam-Energy Measurements at Proscan." PSI-Scientific and Technical Report 2003, vol. VI, pp. 103-104.

Jeong-Wan Kwon et al., "Development of a CCD-Scintillator Device and a Multi-Layer Faraday Cup for Therapeutic Proton Beam Monitoring." Journal of the Korean Physical Society, South Korea, vol. 48, No. 4, Apr. 2006, pp. 759-762.

International Application No. PCT/EP2009/053761, Notification of Transmittal of The International Search Report and The Written Opinion Of the International Searching Authority, or the Declaration, mailed Aug. 31, 2009, 13 pages. (corresponds to U.S. Appl. No. 12/935,254).

* cited by examiner

DEVICE AND METHOD FOR MEASURING CHARACTERISTICS OF AN ION BEAM

CROSS REFERENCE TO RELATED APPLICATIONS

This application is a national phase application of International Application No. PCT/EP2009/053761, filed Mar. 30, 2009, designating the United States and claiming priority to European Patent Application No. 08153676.5, filed Mar. 29,

TECHNICAL FIELD

The invention relates to the field of Hadron Therapy, i.e. radiation therapy using strongly interacting particles. More particularly, the invention relates to a detector and method for measuring the range as well as the energy spread of a particle beam.

DESCRIPTION OF RELATED ART

It is now well established that hadrons (i.e. neutrons, protons, pions, ions such as carbon ions) have physical advantages with respect to X-rays or gamma rays in the field of radiation therapy. For example, hadrons of a given energy (i.e. forming a mono-energetic hadron beam), have a range which is defined as the penetration depth in matter and do not penetrate beyond that range, and furthermore, they deposit their maximum amount of energy in the so-called Bragg Peak, which corresponds to the point of greatest penetration of the radiation in the target volume. Since the Bragg peak position depends on the energy of the hadron beam, it is evident that by precisely controlling and modifying the energy one can place the Bragg Peak at a suited depth of a tumour so as to administer the greatest radiation energy to a selected volume points and spare, by contrast, healthy tissue surrounding said points.

By combining several mono-energetic hadron beams of different energies (i.e. performing the so-called range modulation) it is possible to extend the Bragg Peak in order to match the thickness of the tumour and irradiate the target with a uniform dose while controlling the dose load on surrounding healthy tissue and critical organs.

Many techniques have been developed so far for delivering the dose according to a required pattern. In standard proton therapy, a proton beam entering the treatment delivery nozzle is scattered into a broad, uniform beam and then shaped to conform to the tumor. This is the double scattering method which combines the use of a first and a second scatterer for producing a beam having a width larger than the tumor and a collimator for "shaving" the beam to the exact tumor shape.

Another well-known technique is the voxel scanning method which consists in dividing the target volume in volume elements called "voxels" and delivering the beam to a first voxel until the prescribed dose is reached. Subsequently, the irradiation is halted by means of a fast kicker magnet which diverts the beam in another direction. A sweeper magnet is then instructed to direct the beam to a next voxel, and the irradiation of this voxel is performed.

The document EP1147693 of the applicant discloses a alternative technique, called "Pencil Beam Scanning" wherein the beam is no more interrupted when scanning each individual voxel. In this method the particle beam is swept across the target by means of magnets which move in two orthogonal directions respectively. The target volume is therefore irradiated layer by layer. With a simultaneous modulation of the beam spot speed and variation of beam current, it is possible to obtain any dose distribution on a scanned slice.

All these techniques imply a quality control of the particle beam. The quality control of a proton beam can be defined in terms of its energy and energy spread, corresponding to the particle range and the sharpness of dose fall-off in matter, respectively. In order to perform such a quality control, it is necessary to measure characteristics of the particle beam by means of a detector. Currently, one of the following three types of detectors is used for performing quality control of the particle beam, according to prior art.

The first type of detector consists of an ionization chamber 101 moving along the axis of an ion beam 100 within a reservoir 103 filled with water 102, as shown in FIG. 1. The variation of the radiation dose produced by the ion beam 100 along the beam axis allows a precise measurement of the energy or range of said beam. One example of such a water phantom is the product Blue Phantom manufactured by the applicant. In such a water phantom, the detector is positioned in a location where a measurement is desired, the radiation beam is emitted while the measurement is taken, and then stopped. The detector is then moved to a next position until a full dose map is obtained. This procedure is however time consuming, and moreover, depends on the stability of the beam characteristics among measurements. In addition, this process cannot be applied to radiation delivery methods where collimators are moved while irradiating, such as the virtual wedge method or IMRT, or for the case of active beams using a scanning technique.

The second type of detector is made of a plurality of stacked ionization chambers 201 separated by absorbing material 202, as schematically shown in FIG. 2. The dose measured on each ionization chamber allows a reconstruction of the dose produced by the ion beam 200 along the beam axis from which the range or energy of the beam can be deduced. An example of such a dosimeter, suitable for performing fast routine 3D dose verification, is the dosimeter disclosed by document WO 05006017 A1 or the product Magic Cube developed by INFN and University of Torino and described in document "Verification of 3D dose distributions in heavy-ion radiotherapy", C. Brusasco et al. J. Jpn. Soc. Ther. Radiol. Oncol. 9 (1997), suppl. 2, p. 59. However, this type of detector is not adequate for particular applications wherein the ratio between the span of measurable energy and the required resolution is high In such applications, in fact, it would be required a very great number of ionization chambers. For example, the measurement of a 4 to 32 g/cm2 beam range might require up to 100 ionization chambers to obtain resolution around 0.1 g/cm2.

The third type of detector is made of a plurality of faraday cups 301 separated by an insulating material 302 and comprising a charge or current measure device 303 for each faraday cup, as schematically shown in FIG. 3. Ions of the ion beam 300 passing through this detector stop over one of the plates, depending on the energy of the beam, and generate a current on this plate which is measured by said charge or current measure device 303. The identification of the plate which stops the beam gives an estimation of the energy or range of the incident ion beam 300. An example of such a detector is described in "Test of a multi-layer Faraday cup for quick beam-energy measurements at Proscan", H. Berkhoff et al., PSI—Scientific and Technical Report 2003/Volume VI) or in document "Development of a CCD-Scintillator Device and a Multi-Layer Faraday Cup for Therapeutic Proton Beam Monitoring", Jeong-Wan Kwon et al., Journal of the Korean Physical Society, Vol. 48, No. 4, April 2006, pp. 759 to 762.

However, such a detector is very complex, difficult to assemble, sensitive and unreliable (due to shorts between plates) since it requires a lot of plates and a very thin insulator between said plates in order to obtain a better resolution (the resolution of a sensor being the smallest change it can detect in the quantity that it is measuring).

In the field of photon therapy a device for measuring the energy distribution is disclosed in patent DE19606809C1. In DE19606809C1 a photon field is crossing two different types of materials (e.g. Pb and Al) having a given thickness and the remaining intensity of the photon field is determined after crossing the different materials. Based on the intensity ratio of the photons after crossing the different materials information on the energy distribution is obtained. This method is based on the mechanism that photons steadily dissipate their energy as they cross material. As discussed in DE19606809C1 the remaining intensity of photons after penetrating a piece of material can be described by a simple exponential function which depends on the thickness of the material and an energy dependent absorption coefficient. Such a device and method described in DE19606809C1 can however not be used to measure the energy and energy spread of a hadron beam due to the fundamental difference of energy loss in material between hadrons and photons. Hadrons have a different mechanism to dissipate energy in material: hadrons have a certain range when penetrating material (i.e. a penetration depth in matter) and do not penetrate beyond that range, and furthermore, they deposit their maximum amount of energy in the so-called Bragg Peak, which corresponds to the point of greatest penetration.

AIMS OF THE INVENTION

It is an object of the present invention to provide a detector which overcomes the drawbacks of prior art detectors. More particularly, it is an object of the present invention to provide a less complex detector which is capable of providing measurements with a higher resolution. Yet another object of the present invention is to provide a detector which is easy to use and move.

SUMMARY OF THE INVENTION

In a first aspect, the invention relates to a detector for measuring characteristics of an energetic particle beam generated by a radiation source. The detector comprises a plurality of sensors arranged in the path of said radiation beam and processing means capable of acquiring and processing signals produced by said sensors. According to the invention, the detector comprises means for varying the energy of said particle beam, said means being located in the path of said particle beam and in between said plurality of sensors and said radiation source. The processing means are adapted to receive said signals of said plurality of sensors in dependence of said energy variation of said particle beam and processing means are further adapted to process said signals for determining said characteristics. The characteristics may comprise the energy and/or the energy spread of the particle beam. In general the characteristic determined is the water equivalent range of the particle beam expressed in g/cm$^2$. In addition, the sharpness of the falloff of the beam can be determined (this can for example be expressed as the 80%-20% beam intensity fall-off or dose fall-off which can also be expressed in g/cm$^2$).

In a first embodiment of the invention, the means for varying the energy of the particle beam comprises a wedge-shaped element whereby the thickness of said wedge-shaped element encountered by said beam when crossing said wedge-shaped element varies while changing the crossing position of the beam on said wedge-shaped element.

In a second embodiment of the invention, means for varying the energy of said particle beam comprises <<non-flat>> element capable of rotating around an axis parallel to the particle beam direction, whereby the thickness of said element encountered by said beam when crossing said element varies while rotating said element.

Preferably, said <<non-flat>> element is a helical wheel having a non constant thickness.

Said helical wheel is advantageously made up of a polycarbonate resin thermoplastic material (e.g. Lexan®).

The geometry and thickness of the wedge-shaped element (either a fixed element or a moving element) needs to be determined as function of the thickness of the sensors used. In order to be able to shift the beam from one sensor to an adjacent sensor; the wedge-shaped element should have a water equivalent thickness up to at least the water equivalent thickness of one sensor. The thickness of the senor needs to be determined as function of the beam ranges that need to be measured and the particle type of the beam (e.g. proton, carbon ion, ... ).

The detector may further comprise a counter wedge located between said helical wheel and said plurality of conductive plates. Said counter wedge is then capable of compensating the gradient of said <<non-flat>> element when rotating, whereby it is possible to keep the same range shift over the full cross sectional area when the incident beam passes through said helical wheel.

The detector may further comprises grounded plates between said plurality of sensors and isolated from said plurality of sensors by means of insulating plates, for improving the capacity of said plurality of sensors, whereby allowing the detector to collect or integrate the charge deposited from said incoming particle beam.

The sensors are advantageously faraday cups.

Said faraday cups may be separated from each other by means of insulating plates made up of Methyl PolyMethylAcrylate (PMMA).

The sensors may also be chosen among ionization chambers or scintillators with photomultipliers.

In a second aspect, the invention relates to method for measuring characteristics of an energetic particle beam generated by a radiation source, said method comprising the steps of:
a) providing a detector according to the invention
b) delivering said energetic particle beam;
c) varying the energy of the said particle beam using energy variation means of said detector;
d) measuring signals produced by said particle beam in the sensors of said detector in correlation with said energy variation;
e) analysing said signals measured in correlation with said energy variation for determining characteristics of said particle beam.

DETAILED DESCRIPTION OF THE INVENTION

According to preferred embodiments described in FIGS. 4 to 10, the present invention relates to a detector (400, 600) for measuring the characteristics of a particle beam (1000) generated by a radiation source, the detector (400, 600) comprising a plurality of sensors (402, 402a, 402b, 602) arranged in the path of said radiation beam and a processing unit (PU) capable of processing signals produced by said sensors (402, 402a, 402b, 602), wherein the detector (400, 600) comprises an element (404, 604) having a non-uniform thickness—said thickness being measure along the path of said radiation beam, so called "non-flat" element, located between said plurality of sensors (402, 402a, 402b, 602) and said radiation source, in the path of said particle beam (1000);

the processing unit (PU) is adapted to control said non-flat element (405, 604) to present different thicknesses to the incident particle beam (1000) when the relative position (A, B, C, D, E, F, θ) between said particle beam (1000) and said non-flat element (405, 604) varies;

the processing (PU) unit is adapted to receive the signals of said plurality of sensors (402, 402a, 402b, 602) in dependence of said relative position (A, B, C, D, E, F, θ) and;

the processing unit (PU) is adapted to process said signals for determining said characteristics.

According to another aspect, the present invention relates to a method for measuring the characteristics of a particle beam generated by a radiation source, said method comprising the steps of:

a) providing the detector (400, 600) as mentioned hereabove;

b) positioning said non-flat element (404, 604) in a given relative position (A, B, C, D, E, F, θ) with respect to said particle beam (1000);

c) delivering said particle beam (1000);

d) measuring signals produced by said particle beam (1000) in the sensors of said detector (400, 600);

e) repeating steps b to d for different relative positions (A, B, C, D, E, F, θ);

f) collecting all measurements obtained in step d;

g) processing by means of said processing unit (PU) all collected measurements in order to determine characteristics of said particle beam (1000).

Figure 1:
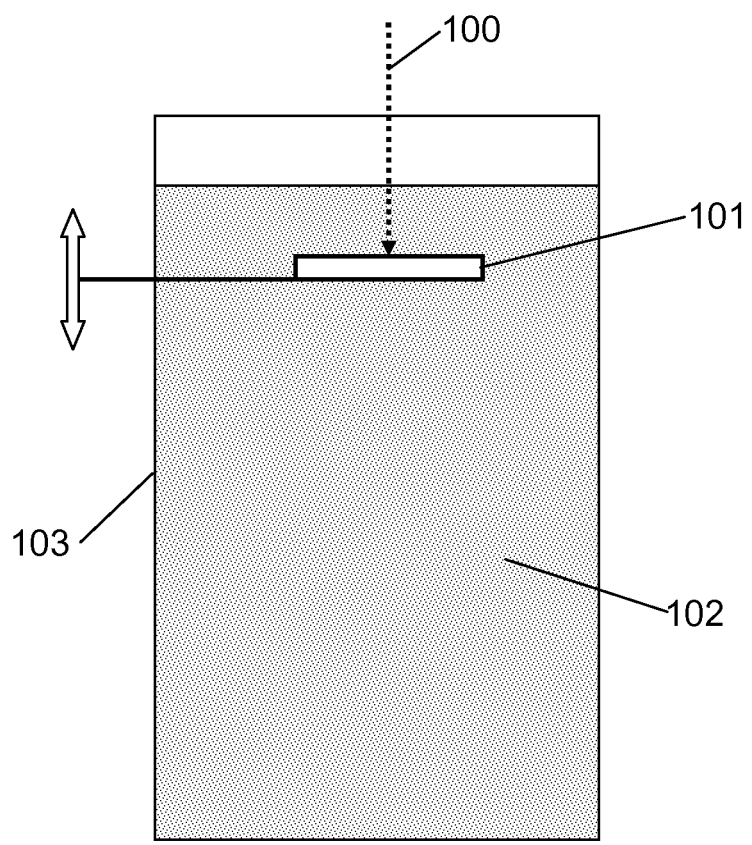
FIG. 1 is a side view of a first type of detector of the prior art.
Figure 2:
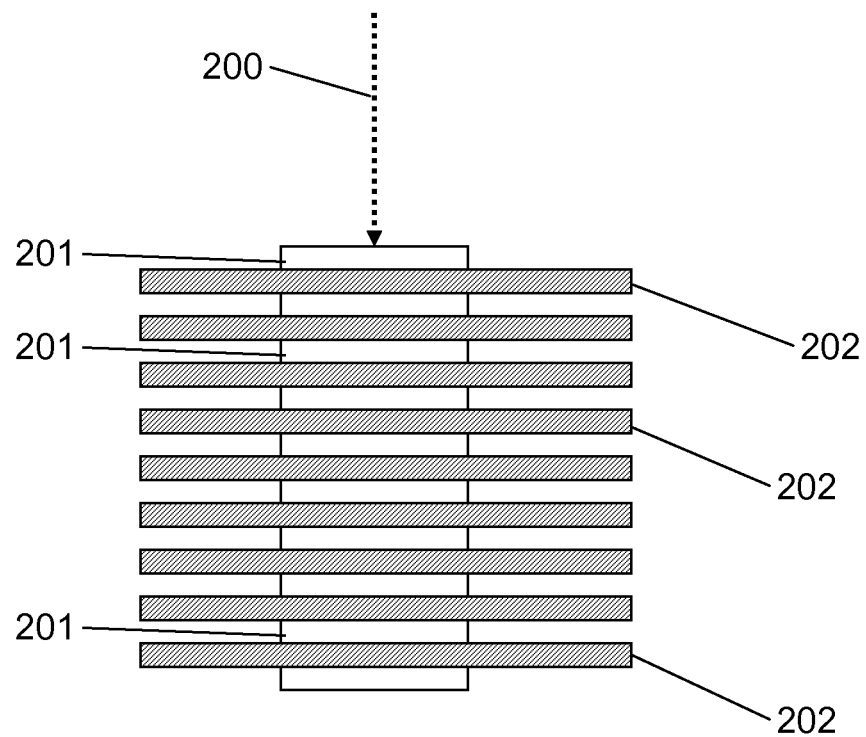
FIG. 2 is a side view of a second type of detector of the prior art.
Figure 3:
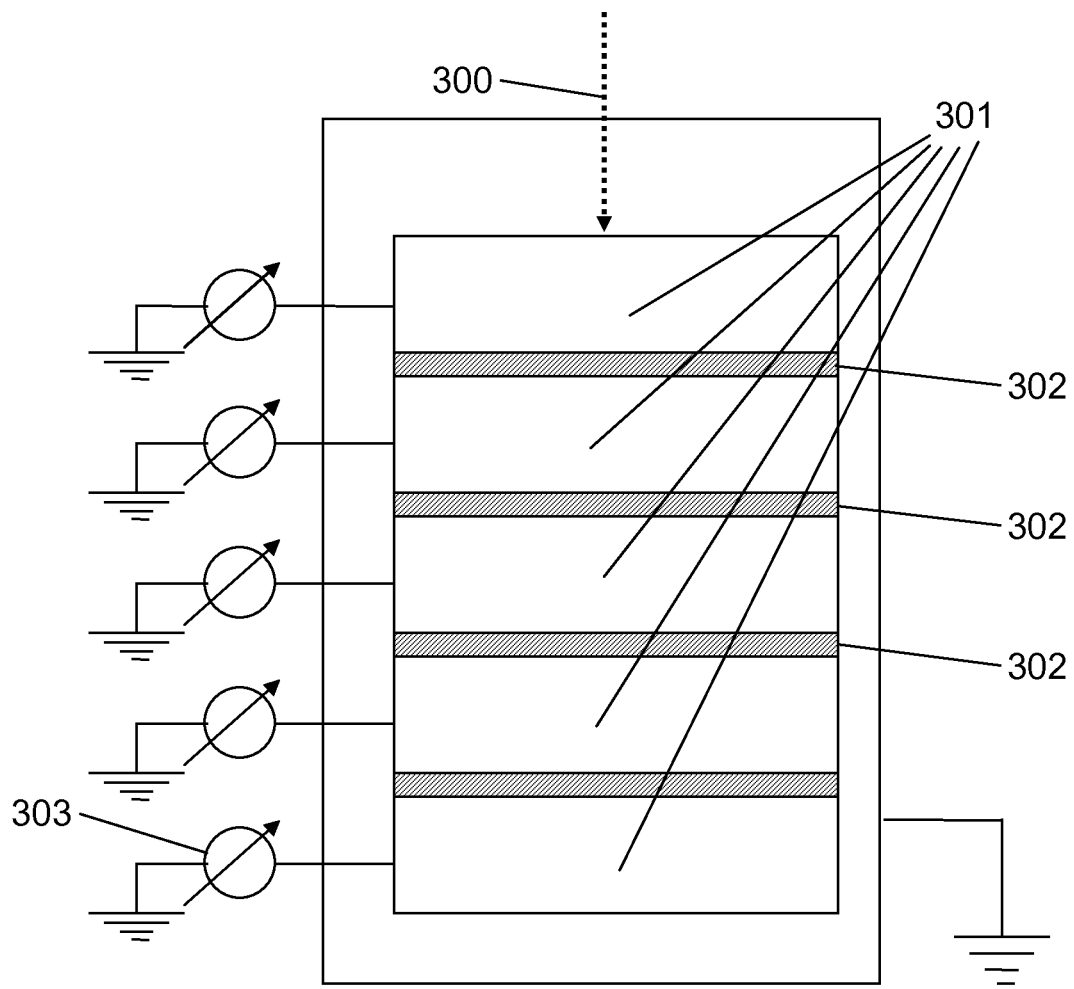
FIG. 3 is a side view of a third type detector of the prior art.
Figure 4:
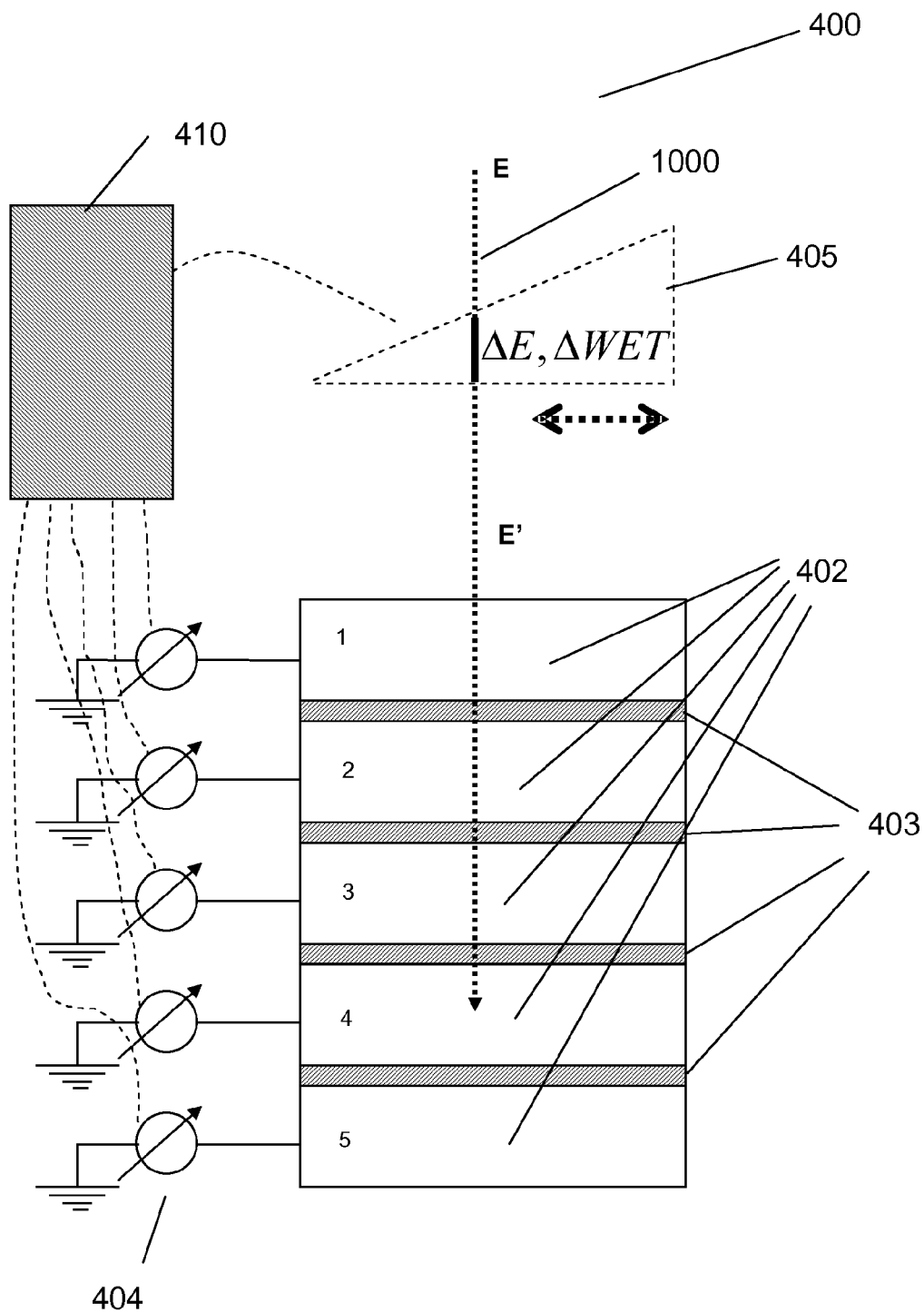
FIG. 4 is an illustration of the main components of a device according to the invention.

FIG. 4 illustrates the principles and main components of the device 400 of the invention. The incoming hadron beam 1000 has a given energy E which allows to penetrate material. The penetration depth in material, also called range in material is in general expressed in terms of a water equivalent thickness (WET). For example an proton beam having an energy of 230 MeV has a range or a penetration depth of about 32.7 cm in water (this corresponds to a water equivalent thickness WET=32.7 g/cm$^2$). The incoming beam has in general also an energy spread which defines the sharpness of the so called distal dose fall-off in matter. The device of the invention allows to measure the water equivalent range of the hadron beam 1000. In addition, the sharpness of the intensity falloff in material (and related distal dose fall-off) which depends on the energy spread of the beam 1000, can be deduced. The device of the invention comprises means 405 to vary the incoming energy E of the hadron beam by an amount ΔE in order to obtain a beam with a lower energy E'. The means 405 allow to vary the incoming energy continuously or in small steps over a certain energy range (i.e. the ΔE is variable). To modify the energy E of the incoming beam 1000 an amount of material (further named energy modifier) can be put in front of the beam to reduce the energy. By modifying the thickness of the material of this energy modifier the energy of the beam can be varied. The resulting beam after crossing the energy modifier has a different energy value E' and as a consequence the resulting beam has a different remaining water equivalent range (expressed in g/cm$^2$) when compared with the incoming beam having an energy E. The difference in water equivalent range between the beam having an energy E and the beam having an energy E' corresponds to thickness of the energy modifier when expressed as a water equivalent thickness (i.e. ΔWET as illustrated on FIG. 4). In other words, the variations of the beam energy ΔE which result in variations of the water equivalent range of the beam can be expressed in terms of water equivalent material thickness variations (ΔWET expressed in g/cm$^2$) of the energy modifier 405. The resulting beam having a lower energy E' sub sequentially penetrates a plurality of sensors 402. When the hadron beam is stopped after crossing one or more sensors a signal is detected with signal acquisition means 404. In FIG. 4, as an example, five sensors 402 numbered from 1 to 5 are provided and, as shown, the hadron beam 1000 is for example stopped in sensor 4 and a signal is acquired with the corresponding signal acquisition means 404 and further processed with the signal processing means 410. In what sensor the beam is stopped will depend on the incoming energy E of the beam, the energy variation ΔE applied with the energy modifier (or in other words the ΔWET of the energy modifier), the material and thickness of the sensors 402 and on the hadron particle type (e.g. proton, carbon ion, . . . ). The sensors 402 can for example be a stack of faraday cups which are separated by insulating material layers 403. The device of the invention comprises processing means 410 to measure the signals detected in each of the sensors 402 in correlation with the applied variation ΔE of the incoming energy.

The advantage of the device of the invention is that a reduced number of sensors 402 can be used and a higher accuracy for determining the beam range is obtained. By varying the incoming energy by an amount ΔE the position where the beam is stopped in the sensors 402 can by varied. For example a hadron beam that is stopped in sensor number 4 can for example be shifted to sensor number 3 by reducing the incoming energy E with the means 405. Each sensor 402 has characterising thickness (which in case of a faraday cup is the thickness of the faraday cup plus the thickness of the insulator). To shift the hadron beam from sensor 4 to sensor 3 the amount of water equivalent material that needs to be put in the beam line in order to reduce the incoming beam energy using means 405 must at least be equal or larger than the water equivalent thickness of one sensor 402.

Figure 5:
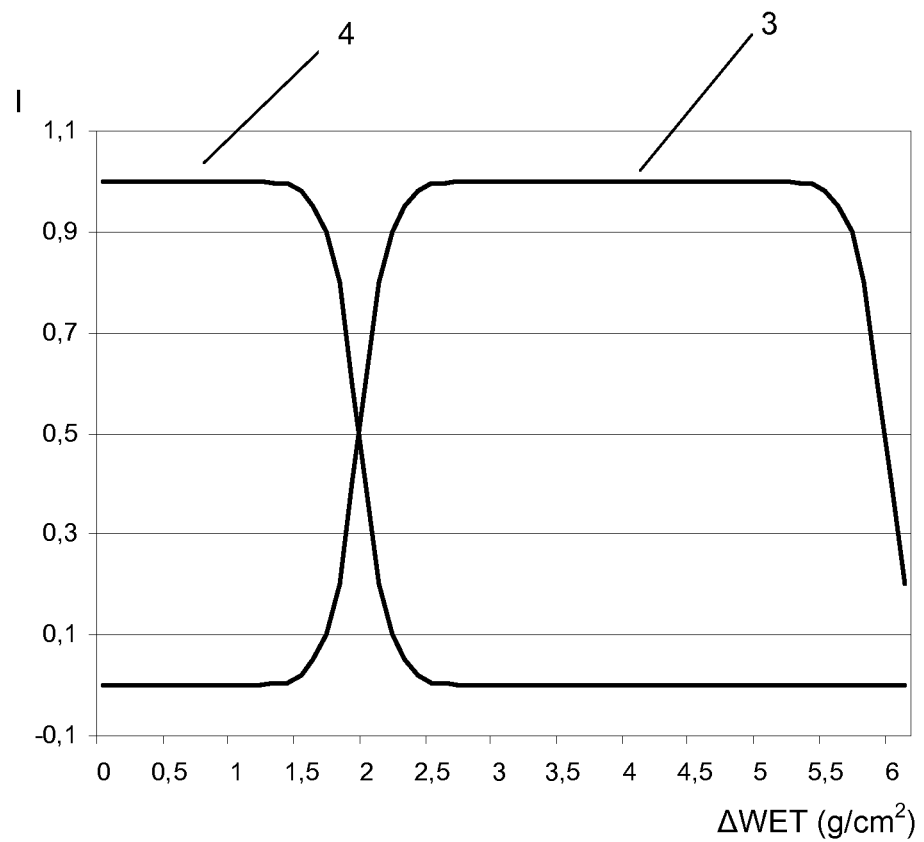
FIG. 5 is an example of signals measured with the device of FIG. 4.

When a faraday cup is used as a sensor one can plot the measured current in the various sensors as function of the variation of the water equivalent thickness (ΔWET expressed in g/cm$^2$) obtained by means 405. This is illustrated in FIG. 5 where the relative signal intensity of sensor number 4 and sensor number 3 are plotted as function of the applied water equivalent thickness variation (ΔWET expressed in g/cm$^2$) with the energy modifier 405. In this example it was assumed that a range or penetration depth of a proton beam with incoming energy E corresponding to a water equivalent proton range of about 14 g/cm$^2$ needs to be measured with high accuracy (e.g. of the order of 0.01 g/cm$^2$ to 0.05 g/cm$^2$). For this example one can use 4 sensors having each a water equivalent thickness of about 4 g/cm$^2$. If no range shifting is performed with means 405 (i.e. ΔE=0 MeV, or ΔWET=0 g/cm$^2$) the proton beam will stop somewhere in the middle of sensor number 4. By gradually reducing the incoming energy E of the proton beam with means 405 the proton beam will be shifted to sensor 3 as illustrated in FIG. 5. As in this example the sensor thickness is about 4 g/cm$^2$ (WET), the means 405 should be able to reduce the incoming beam with at least 4 g/cm$^2$ (WET), in the example it was assumed that means 405 have a capacity to reduce the range of the incoming beam up to about 6 g/cm$^2$ (WET). As shown on FIG. 5 the current in sensor 4 drops to half its value after inserting 2 g/cm$^2$ (WET) material with means 405, while the current in sensor 3 increases. If the inserted material is further increased the current in sensor 3 will also start to drop if the amount of material inserted becomes larger than the thickness of the sensor. The exact delta value of material thickness (WET) that is needed to shift the beam from sensor 4 to sensor 3 can accurately be obtained by for example fitting the curves of FIG. 5. By knowing accurately this delta value and adding this to the water equivalent thickness of sensors 1 to 3 one obtains the water equivalent range of the beam having an incoming energy E. As illustrated in FIG. 5 when the beam is moving from sensor 4 to sensor 3 the current in sensor 4 does not sharply drop to zero as a block function, this is due to the fact that the beam is has a certain energy spread. By analysing the falling edge of curve 4 or the rising edge of curve 3 the energy spread of the beam can be deduced.

To realise the invention various embodiments can be considered using various types of means 405 to reduce the incoming beam energy and using various types of sensors 402.

The preferred type of sensors to be used are based on a set of conducting plates which are separated by insulating material. By comparing the water equivalent thickness of the conductor plates with the water equivalent thickness of insulator material one can distinguish two type of sensors: sensors using thick conducting plates and thin insulators (e.g. 4 mm copper plates insulated by thin sheets of polyethylene terephthalate polyester) or sensors using thick insulator plates and thin conducting plates (e.g. 3 mm thick polyethylene plates separated by 25 micrometer of brass plates). The exact thicknesses needed are to be determined as function of the hadron ranges to be measured and the type of hadron beam used (proton, carbon ion, . . . ). One can also have sensors where the thickness (in terms of WET) of the conducting plates and thickness of insulating material are of the same order of magnitude. All of these various types of sensor geometries can be used for the purpose of the current invention.

Figure 6:
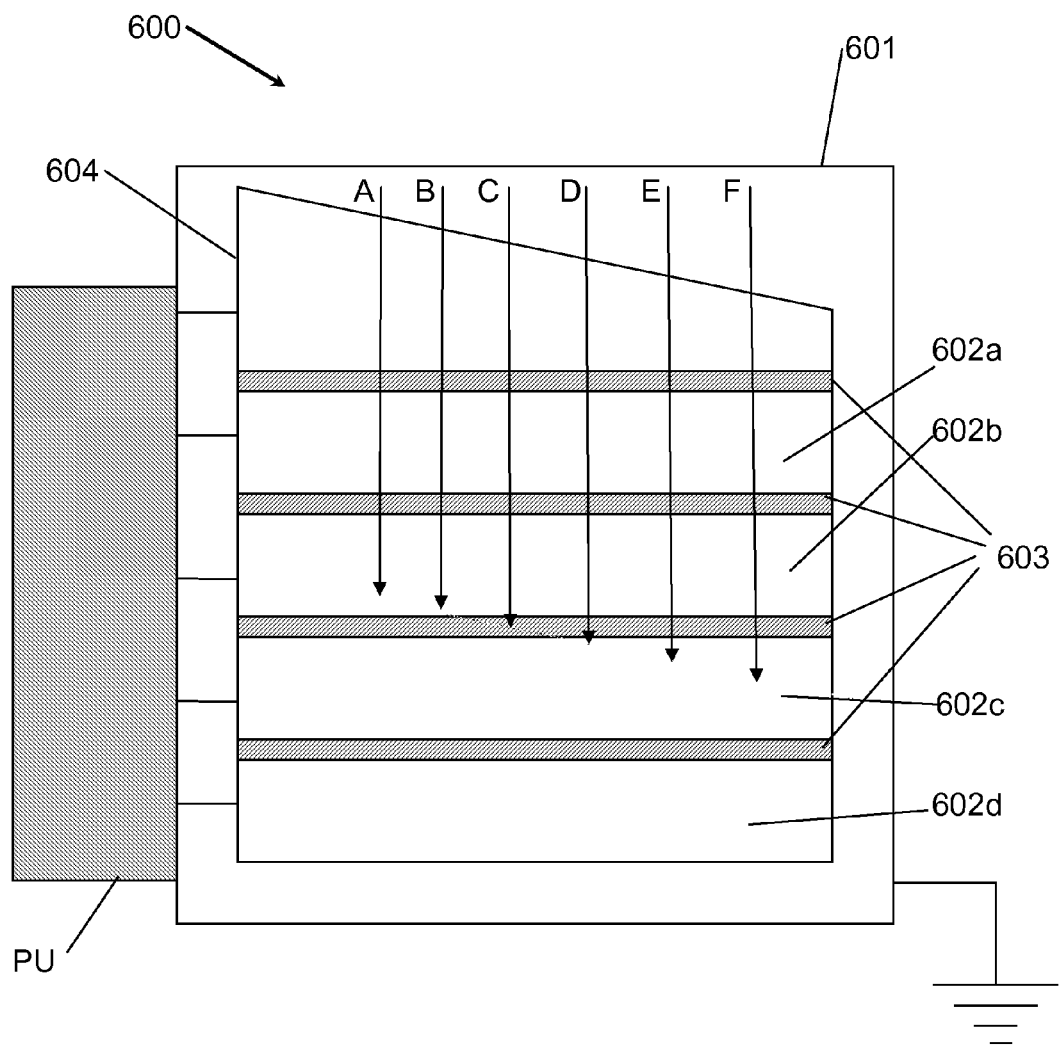
FIG. 6 is a side view of a detector according to a first embodiment of the invention.
Figure 7:
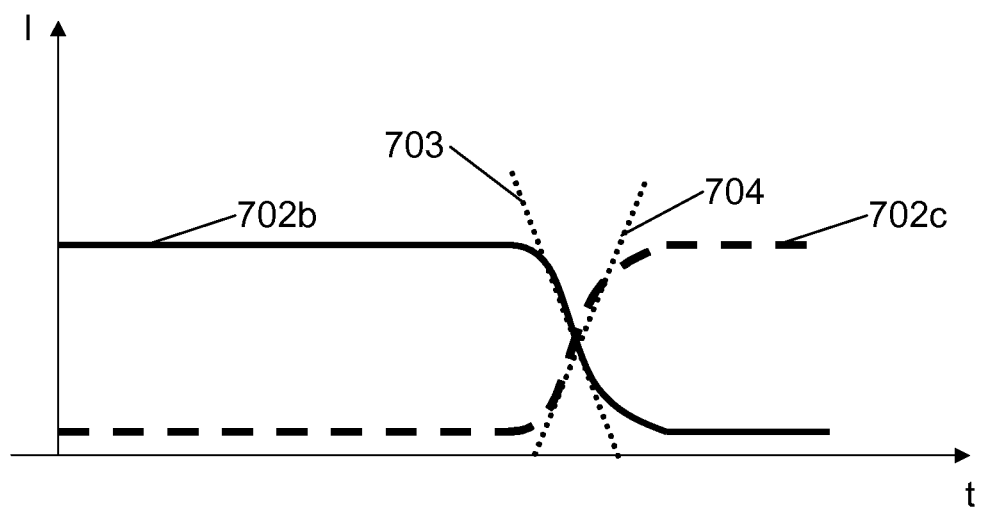
FIG. 7 shows the electrical currents generated by the incoming beam over the detector of FIG. 4 for different positions of said beam over said detector.

FIG. 6 shows a detector 600 according to a first embodiment of the present invention. The detector 600 is here understood to comprise means 405 to vary the incoming energy, sensors 402, signal acquisition means 404 and signal processing means 410 as discussed above in the framework of the conceptual presentation of the invention as illustrated in FIG. 4. The detector 600 is embedded in a housing 601 and comprises a stack of four to eight faraday cups (four faraday cups are shown on FIG. 6: 602a, 602b, 602c, 602d) separated from each other by means of thin insulating plates 603 made up of PMMA for example. Each faraday cup is made up of Copper Tungsten composite and has dimensions of for example 300 mm×65 mm, with thickness of 4 mm. Copper Tungsten composite has a higher stopping power with respect to other material used in prior art (e.g. brass), therefore it is possible to use thinner faraday cups. The detector 600 further comprises a element having a non-uniform thickness—said thickness being measure along the path of said radiation beam—, so called "non-flat" element 604 which is e.g. a wedge-shaped element 604 fixedly mounted on the top of said stack, between said stack 602 and a source of a particle beam. This wedge-shaped element 604 is also made of Copper Tungsten composite and its height varies between 2 mm and 4 mm, and may act as a first faraday cup itself.

When the detector 600 is in use, the incident beam is scanned along the 300 mm over said wedge shaped element 604. While the beam is scanned over the wedge the total thickness of the detector 600 encountered by the particle beam varies accordingly. This is illustrated on FIG. 6 showing various beam crossing positions A, B, C, D, E, F, i.e. positions on the wedge where the beam is crossing the wedge. This can be a continuous position variation for crossing the wedge or a variation in small steps. As a consequence, different relative positions of the beam A,B,C,D,E,F over said wedge-shaped element 604 cause the beam to stop on different faraday cups of said stack. Since dimensions and number of faraday cups, as well as the water equivalent thickness of the materials of faraday cups and insulating plates, are known, it is possible to determine the characteristics of the particle beam by processing measurements of current coming from faraday cups by means of a processing unit. For example, when the particle beam (of given characteristics to be measured) moves from path A to path F, the particle beam would first stop on faraday cup 602a and then progressively on faraday cup 602b. As a consequence and as shown on FIG. 6, the electrical current produced in faraday cup 602b will vary as function of time as shown on curve 702b, while the electrical current produced in faraday cup 602c will vary as shown on curve 702c. By knowing the scanning speed for scanning the beam over the wedge the water equivalent thickness of the wedge seen by the beam at various positions (A,B,C,D,E,F) as function of time can be calculated. Processing unit PU will correlate the thickness of the wedge seen by the beam with the signals detected with the sensors 402a, 402b, 402c, 402d. Alternatively, instead of calculating the beam position by taking into account the scanning speed, an additional detector can be installed upstream of the wedge in order to measure directly the position of the incoming beam. The correlation of the measured currents with the position of the beam (either theoretical or measured through a separate device) will give a very precise measurement of the beam energy (i.e. the particle range). In particular, by looking at slopes 703 and 704 of the curves 702b and 702c, it is possible to have an estimation of the sharpness of dose fall-off in matter (i.e. the energy spread) of the incident beam. The current signals 702b and 702c can be further subtracted from one another to produce a more accurate signal from which induced noise will be completely removed, which further improves the accuracy of the detector. Embodiment 1 can for example be used when a scanning method is applied for beam delivery, in this case the scanning magnets of the nozzle might be used to scan the beam over the wedge 604.

Figure 8:
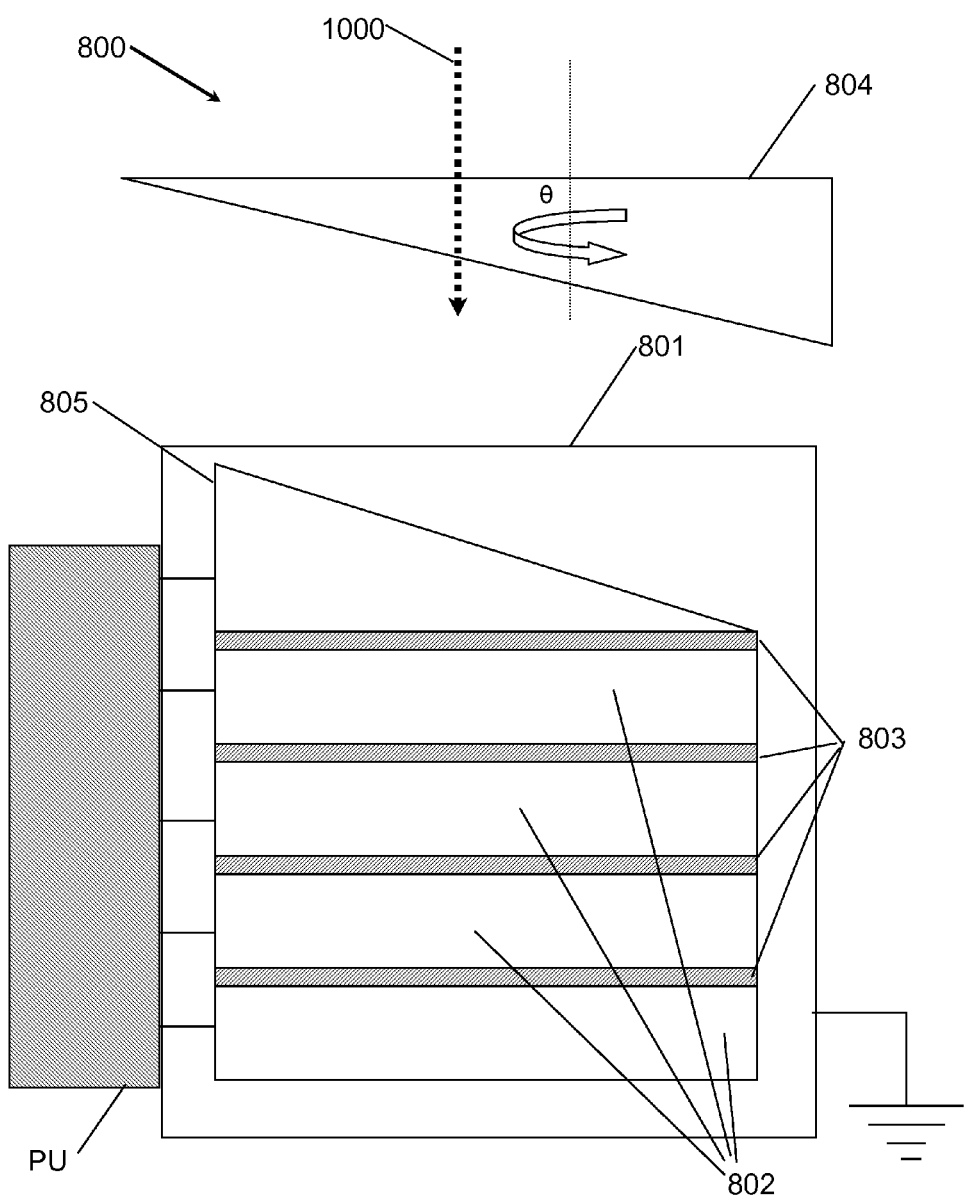
FIG. 8 is a side view of a detector according to a second embodiment of the invention.

FIG. 8 shows a detector 800 according to a second embodiment of the invention. Said detector 800 is also embedded in a housing 801 and comprises a stack of several parallel faraday cups 802 separated from each other by PMMA insulating plates 803. Detector 800 further comprises a rotating helical wedge 804 which is capable of rotating about an axis parallel to the direction of said ion beam 1000 and which is located between the radiation source and said stack of faraday cups 802. This rotating helical wedge 804 is made up of for example polycarbonate resin thermoplastic and has a non constant thickness so that it has a given thickness for a given rotation angle θ. Other materials could be used for the rotating wedge as well (carbon, . . . ).

Figure 10:
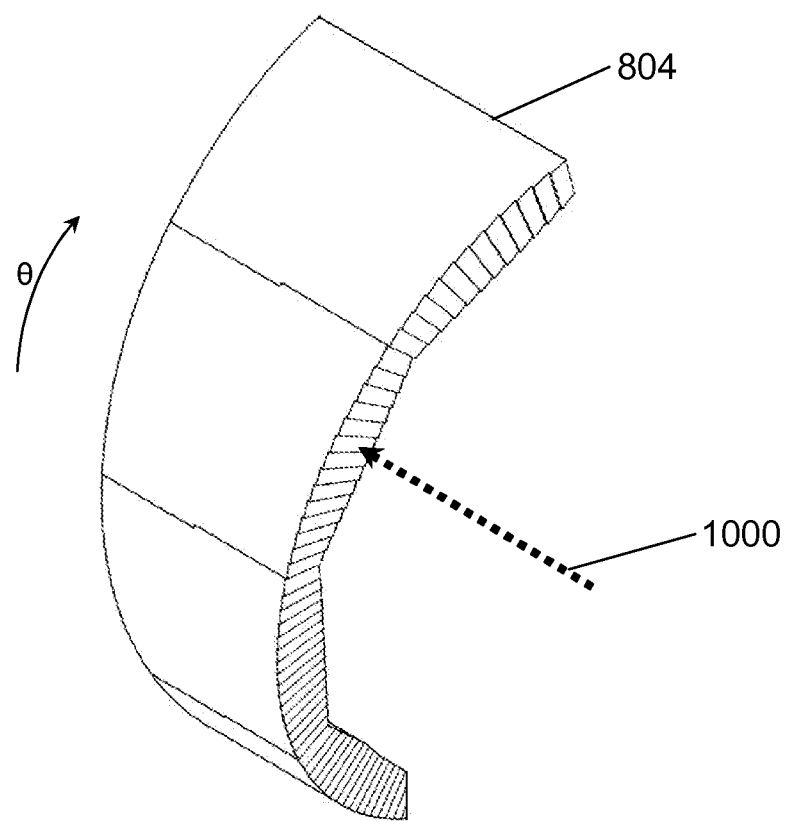
FIG. 10 is a perspective view of the rotating helical wedge of the detector of FIG. 8.

Helical wedge 804 has either a stepped shape, as shown in FIG. 10, or an unidirectional constant gradient with a sharp edge at the end of a turn. In this manner it is possible to modulate the range of the incoming particle beam 1000 by simply rotating said helical wedge 804 of a certain angle θ so that the incident beam passes through a given thickness (corresponding to that angle θ) of said helical wedge 804, as represented in FIG. 10. If the helical wedge has a stepped shape, as shown, the entrance and exit faces of the beam may be parallel. Thereby, even a beam having some width will be uniformly modulated. In the case of a constant gradient wedge, as in the case of the wedge of the first embodiment of the invention, the detector 800 may further optionally comprise a "counter wedge" 805 having a non-uniform thickness located between said helical wedge 804 and said stack of faraday cups 802, in order to compensate the gradient of said helical wedge 804 and to keep the same range shift over the full cross sectional area when the incident beam 1000 passes through said helical wedge 804. Preferably, the exit face of the beam—from the helical wedge—is parallel to the entry face of the beam—into the "counter wedge". For example, if the incident beam should cover a range from 4 to 33 cm and eight Faraday cups would be used, the water equivalent thickness of one faraday cup 802 plus one insulator would need to be about 4.2 g/cm$^2$ in order to cover the full range of beam energy. In order to be able to move the current deposited by the incident beam mainly within the Bragg peak from one Faraday cup 802 to the adjacent one, the modulation depth of one turn of said helical wheel 804 should be larger than the 4.2 g/cm$^2$ and be for example 6 g/cm$^2$. Said helical wheel 804 is driven either by a stepper motor or a free running DC Motor, and in both case at least one light barrier or inductive sensor or other means is used in order to measure the zero position of said helical wheel 804. If a resolution of 360 steps per rotation is used, the precision in determining the beam range should be better than 0.0167 g/cm$^2$, which corresponds to a water equivalent thickness (WET) of 0.167 mm. As a result, by using said helical wheel 804, it is possible to decrease the number of Faraday cups while, by contrast, increase the resolution of the detector.

For a nozzle using a scattering technique and where a rotating range modulator wheel is integrated in the nozzle to modulate the incoming beam, the principles of embodiment 2 can be used to measure the beam range. The range modulator of the nozzle can in this case play the role of rotating wedge 804.

Figure 9:
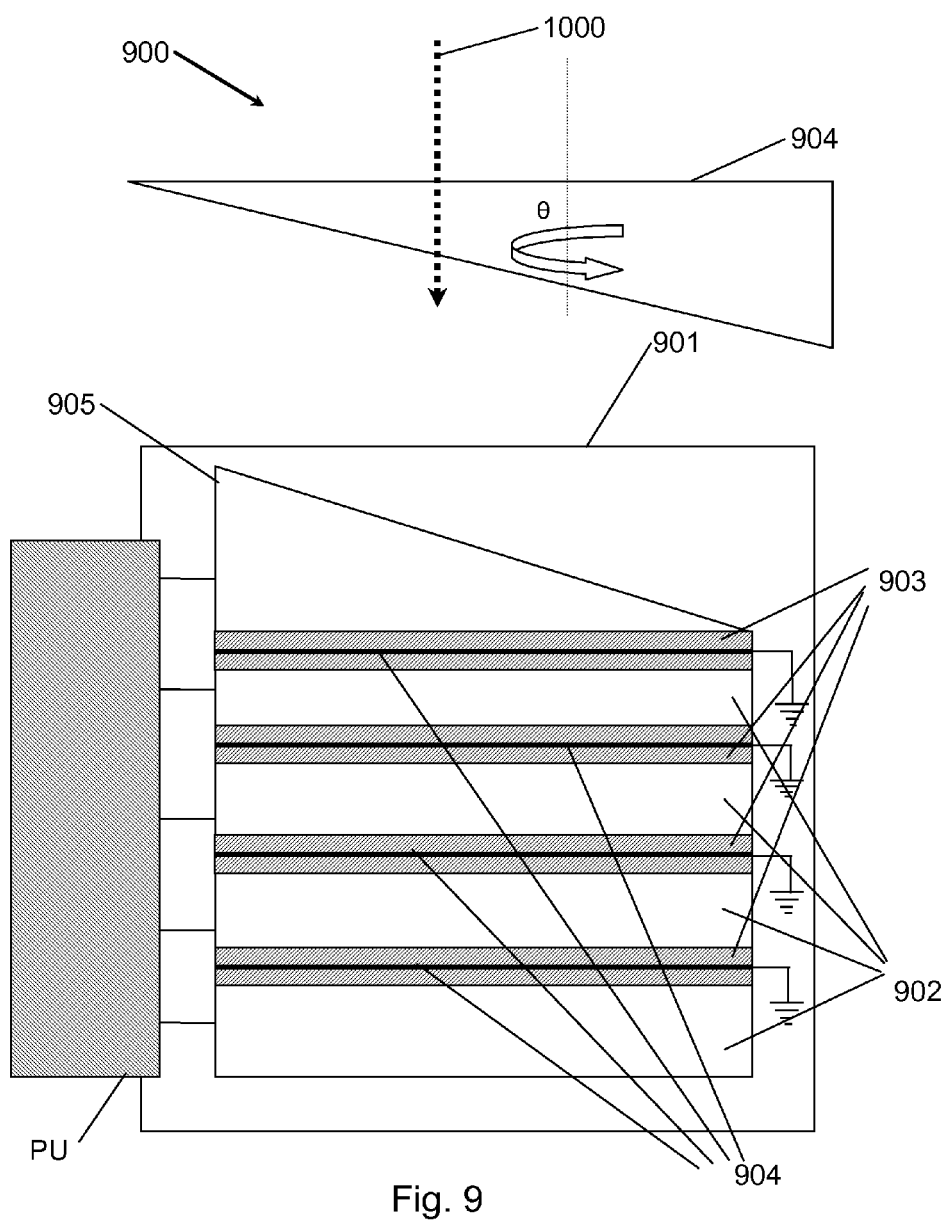
FIG. 9 is a side view of a detector according to a variant of the embodiment of FIG. 8.

According to a variant of the invention, as shown in FIG. 9, said stack of Faraday cups 902 are further separated from each other. As shown on FIG. 9 in-between the insulating plates 903 a thin grounded plates 904 is added. The use of such thin grounded plates 904 reduces influences of adjacent faraday cups as well as electrical influences from the surroundings and allows the detector 600, 800 providing different types of measurement, as follows. Faraday cups act in fact as collecting capacitors which collect or integrate the charge deposited from the incident particle beam 1000. In order to measure this charge each faraday cup can be discharged (e.g. to an integrating circuit) during a very short period, so as to allow using a multiplexer instead of lots of several parallel amplifiers, for example. The current flowing to this integrator depends however on the capacity of the Faraday cups. The presence of said grounded plates 904 around the charge collecting Faraday cups, allows improving and defining in a better way the capacity of Faraday cups. As a result, by using said grounded plates 904, it is therefore possible to provide the detector 600, 800 with additional functionalities, while, by contrast, reducing the number of required components. These grounded plates 904 may be used in both the first and second embodiments of the present invention.

In an alternative embodiment means 405 for modifying the incoming particle energy can also be realized with a wedge-shape element that instead of rotating is making a transversal movement with respect to the beam axis. The processing means shall then correlate the signals measured with the sensors 402 with the transversal position of the wedge.

If the speed of the movement of the transversal wedge and the geometry of the wedge are known a correlation can be made between the signals of the sensors 402 and the water equivalent thickness of the wedge encountered by the beam at the moment of crossing the wedge.

It is evident for a skilled man, depending on the particular application, to replace faraday cups with other suitable detectors, such as ionization chambers, scintillators with photomultipliers, and so on . . . .

Moreover, the thickness of faraday cups may vary depending on the stopping power of the material, energy of the incident beam to be measured as well as required accuracy for measurements.

The detectors 400, 600, 800, 900 all comprise acquisition electronics systems 404 for providing measurements of the particle beam currents. In order to cover the dynamic range of the beam current from less than 1 nA to at least 300 nA, special techniques for data acquisition are needed. However, as the acquired signals may be very noisy, a simple analog to digital conversion would be too sensitive to sudden changes of voltage in the signal. Therefore an integration of the signals is required. This can be done either by analog integration of the current on a capacitor and reading of the voltage through an analog to digital converter (ADC) or through a recycling integrator (with a small quantum of charge) connected to a digital counter. Moreover, this acquisition electronics system may also comprise a microcontroller in order to adapt the acquisition electronics system to new requirements. In particular this acquisition system has the following functionalities:

It converts currents into digital values;
It controls the data exchange with the control system through a data exchange with any data communication hardware as well as with any data exchange protocol;
In case ionization chambers readouts are used, it can provide high voltage power supply to the measurement device.

One or more embodiments of the present invention have been described in detail with reference to the attached figures. It is evident that the invention is only limited by the claims, since the figures described are only schematic and therefore non-limiting. In the figures, the size of some of the elements may be exaggerated and not drawn on scale for illustrative purposes. The dimensions and the relative dimensions do not necessarily correspond to actual reductions to practice of the invention. Further, those skilled in the art can recognize numerous variations and modifications of this invention that are encompassed by its scope. Accordingly, the description of preferred embodiments should not be deemed to limit the scope of the present invention.

It is evident for those skilled in the art that with the necessary adaptations other embodiments of the invention may be easily conceived for other applications.

Furthermore, the terms first, second and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims may be used for descriptive purposes and not necessarily for describing relative positions. The terms so used are interchangeable under appropriate circumstances and the embodiments of the invention described herein can operate in other orientations than described or illustrated herein. For example "underneath" and "above" an element indicates being located at opposite sides of this element.

It is to be noticed that the term "comprising", used in the claims, should not be interpreted as being restricted to the means listed thereafter; it does not exclude other elements or steps.

The invention claimed is:

1. A detector configured to measure characteristics of an energetic particle beam generated by a radiation source, the detector comprising:
    a plurality of sensors arranged in the path of the particle beam, the sensors configured such that the beam crosses the sensors in a sequential order;
    a processor configured to acquire and process signals produced by the sensors when the beam crosses one or more of the plurality of sensors; and
    a beam modification device configured to vary the energy of the particle beam, the beam modification device being located in the path of the particle beam and in-between the plurality of sensors and the radiation source,
    the beam modification device comprising an element in the beam path having a variable thickness and being configured such that the thickness encountered by the beam when crossing the element is varied by varying the relative position of the beam and the element; the processor configured to receive the signals of the plurality of sensors in dependence of the energy variation of the particle beam, and the processor configured to process the signals obtained in dependency of the energy variation for determining the characteristics.

2. The detector according to claim 1, wherein the beam modification device comprises a wedge-shaped element whereby the thickness of the wedge-shaped element encountered by the beam when crossing the wedge-shaped element varies while changing the crossing position on the wedge-shaped element.

3. The detector according to claim 1, wherein the beam modification device comprises a non-flat element capable of rotating around an axis parallel to the particle beam direction, whereby the thickness of the element encountered by the beam when crossing the element varies while rotating the element.

4. The detector according to claim 3, wherein the non-flat element is a helical wheel having a non constant thickness.

5. The detector according to claim 4, wherein the helical wheel comprises a polycarbonate resin thermoplastic material.

6. The detector according to claim 5, wherein the detector further comprises a counter wedge located between the helical wheel and the plurality of sensors, the counter wedge capable of compensating the gradient of the non-flat element when rotating, whereby it is possible to keep the same energy variation over the full cross sectional area when the incident beam passes through the helical wheel.

7. The detector according to claim 4, wherein the detector further comprises a counter wedge located between the helical wheel and the plurality of sensors, the counter wedge capable of compensating the gradient of the non-flat element when rotating, whereby it is possible to keep the same energy variation over the full cross sectional area when the incident beam passes through the helical wheel.

8. The detector according to claim 1, wherein the detector further comprises grounded plates between the plurality of sensors and isolated from said plurality of sensors by insulating plates, for improving the capacity of the plurality of sensors, whereby allowing the detector to collect or integrate the charge deposited from the incoming particle beam.

9. The detector according to claim 1, wherein the sensors are faraday cups.

10. The detector according to claim 9, wherein the faraday cups are separated from each other by insulating plates.

11. The detector according to claim 1, wherein the sensors are selected from the group consisting of ionization chambers and scintillators with photomultipliers.

12. A method for measuring characteristics of an energetic particle beam generated by a radiation source, the method comprising:
    a) providing a detector according to claim 1;
    b) delivering the energetic particle beam;
    c) varying the energy of the particle beam using the beam modification device of the detector;
    d) measuring signals produced by the particle beam in the sensors of the detector in correlation with the energy variation;
    e) analyzing the signals measured in correlation with the energy variation for determining characteristics of the particle beam.

13. A detector configured to measure characteristics of an energetic particle beam generated by a radiation source, the detector comprising:
    a plurality of sensors arranged in the path of the particle beam, the sensors configured such that the beam crosses the sensors in a sequential order;
    a processor configured to acquire and process signals produced by the sensors when the beam crosses one or more of the plurality of sensors; and
    a beam modification device configured to vary the energy of the particle beam, the beam modification device being located in the path of the particle beam and in-between the plurality of sensors and the radiation source,
    the beam modification device comprising an element in the beam path having a variable thickness and being configured such that the thickness encountered by the beam when crossing the element is varied by varying the relative position of the beam and the element; the processor configured to receive the signals of the plurality of sensors in dependence of the energy variation of the particle beam, and the processor configured to process the signals obtained in dependency of the energy variation for determining the characteristics;
    wherein the beam modification device comprises a non-flat element capable of rotating around an axis parallel to the particle beam direction, whereby the thickness of the element encountered by the beam when crossing the element varies while rotating the element.

14. The detector according to claim 13, wherein the non-flat element is a helical wheel having a non constant thickness.

15. The detector according to claim 14, wherein the helical wheel comprises a polycarbonate resin thermoplastic material.

16. The detector according to claim 14, wherein the detector further comprises a counter wedge located between the helical wheel and the plurality of sensors, the counter wedge capable of compensating the gradient of the non-flat element when rotating, whereby it is possible to keep the same energy variation over the full cross sectional area when the incident beam passes through the helical wheel.

17. A detector configured to measure characteristics of an energetic particle beam generated by a radiation source, the detector comprising:

a plurality of sensors arranged in the path of the particle beam, the sensors configured such that the beam crosses the sensors in a sequential order;

a processor configured to acquire and process signals produced by the sensors when the beam crosses one or more of the plurality of sensors and to measure a water equivalent range of the beam;

a beam modification device configured to vary the energy of the particle beam, the beam modification device being located in the path of the particle beam and in-between the plurality of sensors and the radiation source, the beam modification device comprising an element in the beam path having a variable thickness and being configured such that the thickness encountered by the beam when crossing the element is varied by varying the relative position of the beam and the element; the processor configured to receive the signals of the plurality of sensors in dependence of the energy variation of the particle beam, and the processor configured to process the signals obtained in dependency of the energy variation for determining the characteristics; and grounded plates between the plurality of sensors and isolated from said plurality of sensors by insulating plates, for improving the capacity of the plurality of sensors, whereby allowing the detector to collect or integrate the charge deposited from the incoming particle beam.

\* \* \* \* \*